United States Patent
Bechtold

[11] 3,881,801
[45] May 6, 1975

[54] OPTICAL SCANNING SYSTEM
[75] Inventor: Edwin W. Bechtold, Plandome Manor, N.Y.
[73] Assignee: Eltra Corporation, New York, N.Y.
[22] Filed: Sept. 19, 1973
[21] Appl. No.: 398,693

[52] U.S. Cl. .......................... 350/6; 350/7; 350/293
[51] Int. Cl. ............................................ G02b 17/00
[58] Field of Search .................. 350/6, 7, 169–172, 350/293, 294, 299, 285; 178/7.6

[56] References Cited
UNITED STATES PATENTS
| | | | |
|---|---|---|---|
| 3,469,030 | 9/1969 | Priebe | 350/7 |
| 3,520,586 | 7/1970 | Bousky | 350/6 |
| 3,591,249 | 7/1971 | Wildhaber | 350/6 |

Primary Examiner—Alfred E. Smith
Assistant Examiner—Michael J. Tokar
Attorney, Agent, or Firm—Brumbaugh, Graves, Donohue & Raymond

[57] ABSTRACT

An optical scanning system suitable for use, for example, in a phototypesetting machine. The system is capable of either scanning an object image across a planar surface or scanning a planar object and forming a stationary image thereof. The optical system includes, at successive positions along an optical path, an image-forming objective, a movable scanning mirror and an optical device having a curved optical surface for causing the optical system to satisfy the Petzval condition for a flat image surface notwithstanding changes in the angular position of the scanning mirror.

9 Claims, 3 Drawing Figures

OPTICAL SCANNING SYSTEM

BACKGROUND OF THE INVENTION

The present invention relates to an optical system for producing an image of an object, and for linearly scanning either the object or the object image. The optical system is particularly suited for use in a phototypesetting machine.

Phototypesetting or photocomposing machines have been developed in the last several decades to an advanced state of the art. Machines of this type which are disclosed, for example, in the U.S. Pat. No. 3,610,121 and the U.S. Pat. No. 3,668,984 function to project selected type characters onto a photosensitive surface in a justified line. Typically, a phototypesetting machine includes a disk or drum on which are disposed, in one or more circular tracks, a plurality of type characters including letters, symbols, punctuation marks and the like in one or more type fonts. The disk or drum is continuously rotated at high speed to successively present individual type characters to the object position of an optical scanning system. At the instant that a desired character is located at the proper position, the character is illuminated by a flash lamp so that its image may be formed by the optical system on the surface of a light-sensitive medium such as photographic film or paper.

In the past various optical arrangements have been utilized for projecting the image of successive characters to the correct positions on a photosensitive surface to produce a photograph of a justified line of type. In one arrangement the image-forming objective is disposed on a carriage which is selectively moved in small increments so as to focus character images at successive line positions on the photosensitive surface. In another arrangement the photographic film or paper is itself arranged on a carriage which is traversed across the position at which successive character images are formed.

The above two types of optical projection and scanning system place an upper limit on the speed of the phototypesetting device because, nothwithstanding efforts to make the carriages light in weight, these sytems require the repeated starting and stopping of elements which have appreciable inertia.

In another prior art arrangement, character images are spaced on the photosensitive surface through the use of a rotatable reflecting element, such as a mirror, which is moved to different angular positions and therefore reflects the image-bearing light beams to different positions on the photosensitive surface. In arrangements of this type, the character images are focused at positions along an arc of a circle with the axis of rotation of the mirror as its center. In order to maintain proper focus on the photosensitive surface, it has been necessary to curve this surface along the arc of scan. This arrangement has practical drawbacks since handling of photosensitive materials, particularly film, becomes more difficult when the film must be curved transversely to its length.

SUMMARY OF THE INVENTION

It is an object of the present invention to provide an optical scanning system, of the type employing a movable scanning mirror, for projecting the image of an object onto a planar light-sensitive surface.

It is an object of the present invention to provide an optical scanning system of the above-described type which is compact in size.

It is a further object of the present invention to provide an optical scanning system of the above-described type which requires a minimum of lenses.

It is a still further object of the present invention to provide an optical scanning system of the above-described type which may be utilized in the reverse direction to scan an object having a flat surface and project an image of the scanned portion of the object to a stationary position.

These objects, as well as other objects which will become apparent in the discussion that follows, are achieved, according to the present invention, by providing an optical device, arranged between the scanning mirror and the surface to be scanned, having an optical surface of such curvature that the optical system satisfies the Petzval condition for a flat image surface.

The optical device, according to the present invention, may be realized either in the form of a lens or a curved mirror. In a preferred embodiment of the invention a mirror is used which has a spherical reflecting surface with a curvature radius approximately twice the distance between the reflecting surface and the scanning mirror. In this embodiment a semi-reflecting mirror is arranged in the optical path between the spherical reflecting surface and the scanning mirror to deflect light outward toward the photosensitive surface to be scanned after that light has been reflected from the spherical reflecting surface.

Although the optical scanning system according to the present invention is primarly intended for use in a phototypesetting machine, this system is not limited thereto and may be employed whenever the image of an object is to be scanned across a substantially planar surface. In addition, the optical scanning system of the present invention is reversible so that the positions of the object and the object image may be interchanged. Consequently, the optical scanning system may also be utilized in situations where an object having a substantially planar surface is to be scanned and the image thereof projected onto a stationary light-sensitive medium for detection and/or recordation. When used in this mode, the optical system may be useful, for example, in automatic reading and character recognition apparatus.

DETAILED DESCRIPTION OF THE INVENTION

Theoretical explanation

Figure 1:
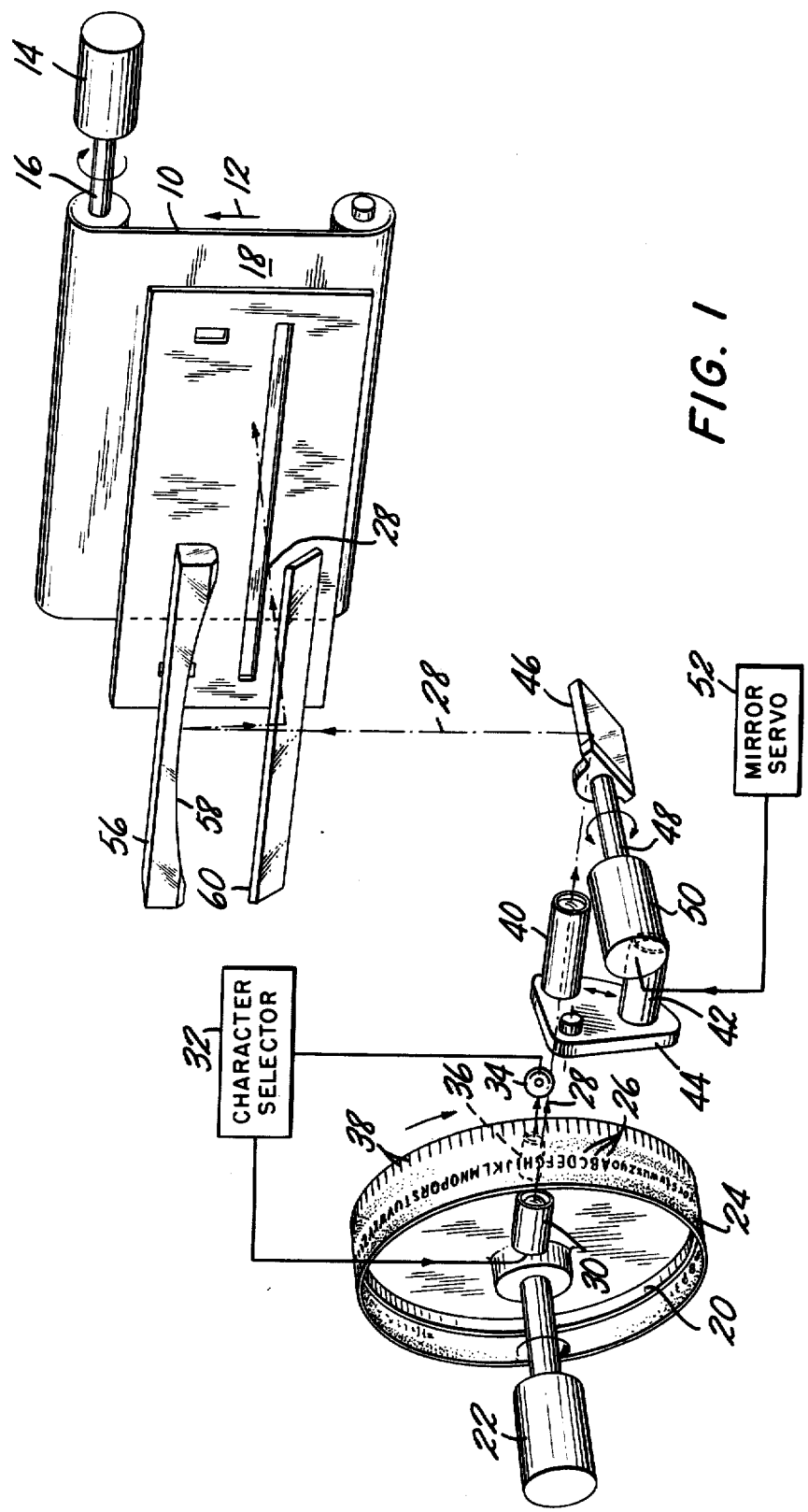
FIG. 1 is a schematic diagram showing the preferred embodiment of the optical scanning system according to the present invention as utilized in a phototypesetting machine.

The theoretical basis of the present invention is best explained with reference to the treaties *Principles of Optics* by Max Born and Emil Wolf, Pergamon Press (3rd Rev. Ed. 1965). On pages 225 and 226 of this text, there is derived a condition, known as "Petzval's Condition," which defines a curved optically transmitting or reflecting surface which can project a spherical object image onto a flat image surface.

Since the optical scanning system in which we are interested has a scanning mirror that focuses an object image on a spherical surface, Petzval's condition may be utilized to focus this image on a planar surface. In particular, if the curved image surface having a radius of curvature equal to the scan radius of the scanning mirror is taken as the Petzval "object surface" having a "Petzval curvature" or, reciprocally, the "Petzval radius", we may project the image on a planar surface by interposing an optical device having a curved optical surface which satisfies the Petzval condition.

In accordance with the preferred embodiment of the present invention, the optical device provided is a mirror having a curved reflecting surface of suitable radius. Utilizing Petzval's condition as set forth in the text by Born and Wolf referred to above, we have:

$$\frac{1}{R_1} + \frac{1}{R_2} \left( \frac{1}{n_i} - \frac{1}{n_{i-1}} \right) = 0$$

Where $R_1$ is the Petzval radius, $R_2$ is the radius of curvature of the reflecting surface and $n_{i-1} = -n_i = 1$ for a mirror in air. Thus:

$$\frac{1}{R_1} - \frac{2}{R_2} = 0;$$
$$R_2 = 2R_1.$$

The radius of curvature of the reflecting surface of the optical device should therefore be twice the Petzval radius or radius of scan of the scanning mirror. This relation would hold and the image distortion would be a minimum if the reflecting surface were parabolic and the distance from the image surface to this reflecting surface were zero at the optical axis. However, because it is more practical, economically, to produce a spherical reflecting surface than a parabolic one, and since it is impossible, physically, to place the image surface in the same location as the optical device, a slight increase in the radius $R_2$ of the reflecting surface is necessary to correct for a resultant slight aberration.

Description of the Preferred Embodiment

The preferred embodiment of the optical scanning system according to the present invention will now be described with reference to FIGS. 1-3 of the drawings. Identical elements in the three figures have been indicated by identical reference numerals.

In the embodiment shown, the optical scanning system is utilized in a phototypesetting machine to project justified lines of type onto photographic film or paper 10. The photographic paper may be incremented in the direction indicated by the arrow 12 by means of a servo motor 14, sprockets 15 and a take-up reel 16 so that type characters may be imaged in successive lines on the photosensitive surface 18.

The type characters are selected and presented to the optical system by a continuously rotating drum 20 which is driven by an electric motor 22. The drum 20 is surrounded by one or more removable strips 24 of film or the like which are normally opaque but have a plurality of transparent type characters 26 arranged thereon in one or more circular tracks.

The drum 20 thus carries type characters for one or more fonts, and repeatedly presents individual type characters to a position aligned with the axis 28 of the optical system. Since the strip or strips 24 are removable, any number of fonts may be selected by applying an appropriate strip to the drum.

A particular, desired type character is made an object of the optical system by momentarily illuminating the character with a high speed flash lamp 30 when the character is aligned with the optical axis 28. The flash lamp 30 is caused to flash at the appropriate instant by character selector circuits indicated in FIG. 1 by the block 32. The character selector counts pulses received from a photocell 34 to determine when the desired character is in the proper position. The photocell 34 receives light that is continuously directed by a lamp 36 toward a track on the strip 24 having a plurality of transparent lines or "pickets" 38 disposed transversely to the direction of drum motion.

Each one of the pickets 38 is arranged opposite one of the type characters 26. At the beginning of the series of pickets along the track there is a space or interruption in the picket sequence which causes the character selector to reset the character count to zero. Thereafter, upon continued rotation of the drum 20, the lamp 30 is flashed when the actual character count reaches the count of the desired character that is to be recorded on the photosensitive surface 18.

Images of successive characters 26 are formed by an objective 40 which may, in this case, be a narrow angle lens system because both the object and the area on which the object image is to be formed are small. In order to permit the characters 26 on the strip 24 to be imaged in different "point" sizes, one or more additional objectives 42 may be arranged on a turret 44 for insertion along the optical axis 28.

Scanning of the character images across the photosensitive surface 18 is effected by a scanning mirror 46 which is rotated about a pivot shaft 48 by a servo motor 50. The motor 50 is controlled by a suitable drive circuit, indicated in FIG. 1 by the block 52, in such a way that the character images are properly spaced in a justified line.

Figure 2:
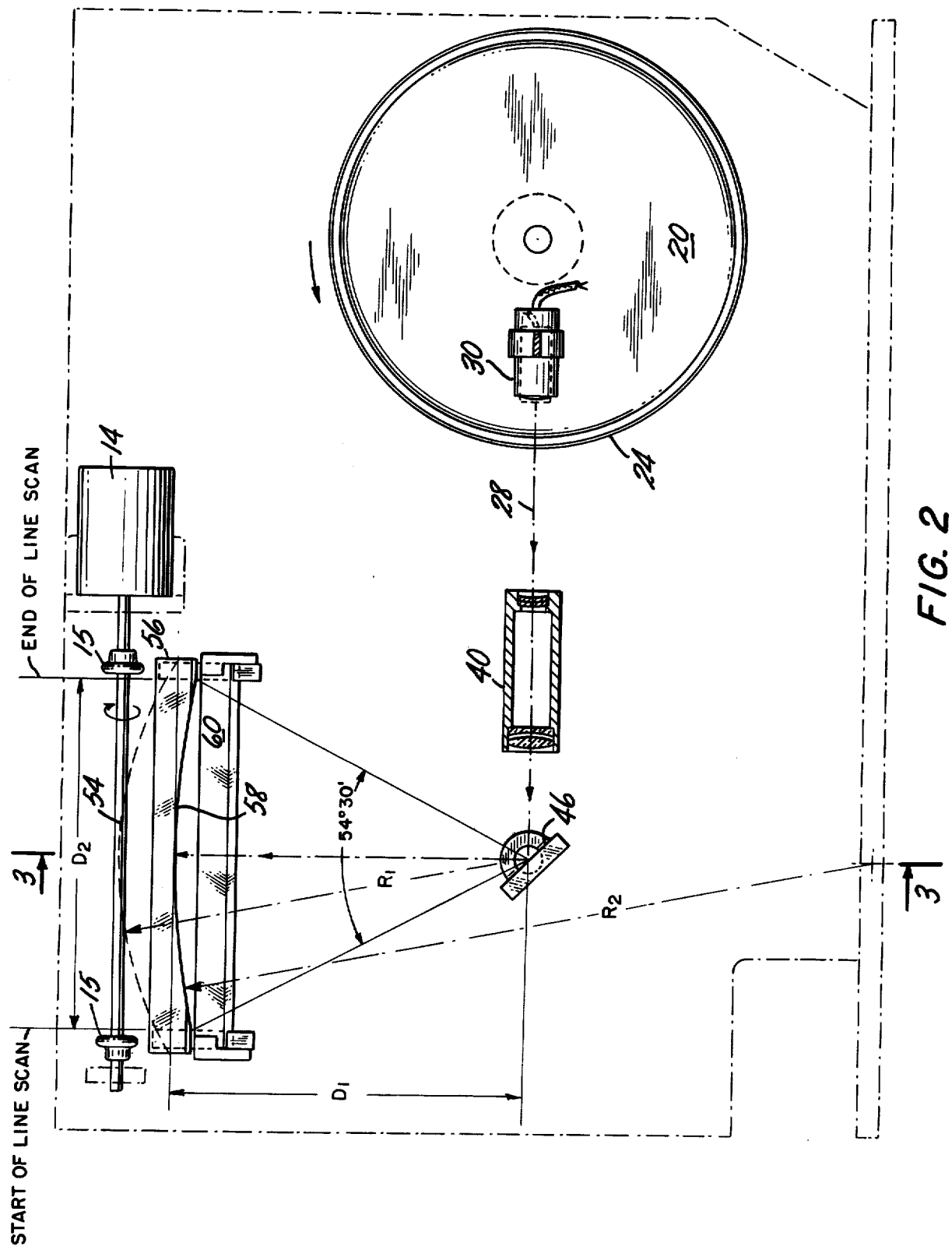
FIG. 2 is an elevational view, partly in cross section, of one side of the optical scanning system illustrated in FIG. 1.

As shown in FIG. 2, the angular movement of the scanning mirror 46 is limited to an arc of 54° 30'. In the absence of any correcting device for producing a flat image field, the optical system would focus character images on an arcuate surface 54 with a scan radius $R_1$, extending from the pivot axis of the mirror 46, equal to 8.667 inches. In order to focus the character images on a planar surface, the surface 54 is taken to be an object surface, so that $R_1$ becomes a "Petzval radius," and an optical device, having a curved optical surface satisfying the Petzval condition for a flat image surface, is interposed between the mirror 46 and the image surface. In the embodiment shown, this device is an element 56 having a curved reflecting surface 58.

Although for ideal correction the reflecting surface 58 should be parabolic, the element 56 is more economically realized if the reflecting surface 58 is made spherical. With the proper choice of its radius of curvature $R_2$, the spherical surface introduces negligible distortion in the images projected on a planar surface.

In the preferred embodiment of the present invention the radius of curvature $R_2$ of the reflecting surface 58 and the distance from the centers of the mirror 46 and the surface 58 are as follows:

$$R_2 = 17.83 \text{ inches}$$
$$D_1 = 7.567 \text{ inches}$$

The distance $D_2$ from the start of the line scan to the end of the line scan — that is, the maximum width of a photographed line — is therefore equal to 7.50 inches.

Figure 3:
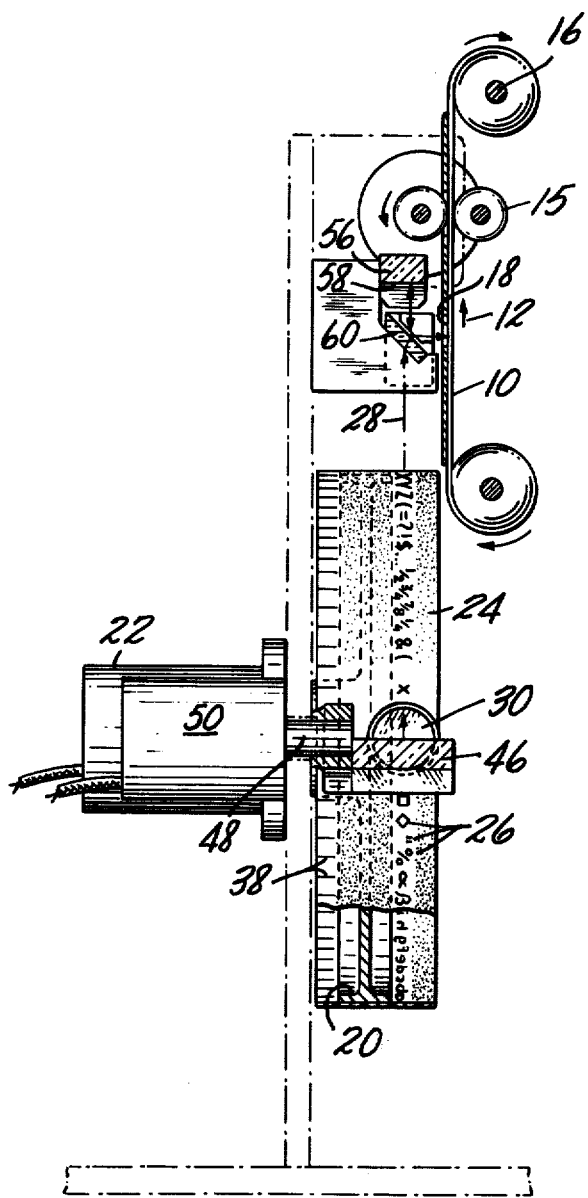
FIG. 3 is an elevational view, partly in cross section, of another side of the optical scanning system illustrated in FIG. 1.

In order to deflect the optical axis 28 away from the region between the scanning mirror 46 and the curved reflecting surface 58, a partially reflecting mirror 60 is arranged in the position indicated in FIGS. 1–3. As illustrated in FIG. 1, the light from the flash lamp 30 which follows the axis 28 of the optical system is first reflected by the scanning mirror 46 through the partial mirror 60 to the curved reflecting surface 58, and then reflected outward by the mirror 60 to the photosensitive surface 18 of the photographic paper 10. Since the partial mirror 60 has a planar semi-reflecting surface, it plays no part in correcting for the curvature in the object image introduced by the scanning mirror 46.

The description of the preferred embodiment of the optical scanning system according to the present invention is now complete. As will be appreciated from the illustration of this embodiment in FIGS. 1–3 and the description above, the optical scanning system according to the present invention is reversible; that is, the positions of the object and the object image may be interchanged so that, instead of scanning images across a light-sensitive medium, the optical system may scan a planar surface of an object and project its image onto a stationary position.

This converse arrangement of the optical scanning system according to the present invention may be utilized, for example, with a character recognition system for the scanning of documents. In this case, the documents to be scanned are arranged at the position of the photographic paper 10 and each character scanned is imaged on a light-sensitive medium or sensor arranged on the optical axis 28 at the position of the strip 24.

It will further be understood that the optical scanning system according to the present invention is susceptable to various modifications, changes and adaptations as will occur to those skilled in the art. It is therefore intended that the scope of the present invention be limited only by the following claims and their equivalents.

I claim:

1. An optical scanning system for arrangement between an object and a light-sensitive medium, said optical system comprising, in combination:
   a. an objective for forming an image of the object on the light-sensitive medium, the route of projected light from said object to said image defining an optical path having two ends;
   b. first mirror means arranged in said optical path between one end thereof and said objective, said first mirror means being selectively movable about a pivot axis for changing angularly the direction of the portion of said optical path between said one end and said first mirror means, the distance between said one end and said first mirror means thereby defining a radius of scan; and
   c. second mirror means arranged in said optical path between said one end thereof and said first mirror means, said second mirror means having a curved reflecting surface with a radius of curvature that is substantially twice said radius of scan;

whereby the optical system satisfies the Petzval condition for a flat image surface so that movement of said first mirror means causes said one end of said optical path to move linearly.

2. The optical system defined in claim 1, wherein said first mirror means has a plane reflecting surface for deflecting projected light in said optical path.

3. The optical system defined in claim 1, wherein said curved reflecting surface of said second mirror means is a spherical reflecting surface.

4. The optical system defined in claim 1, further comprising a partial mirror arranged in said optical path between said first mirror means and said curved reflecting surface of said second mirror means, said partial mirror having a partially reflecting surface for deflecting projected light in the portion of said optical path between said one end and said curved reflecting surface.

5. The optical system defined in claim 1, wherein the object is arranged at said one end of said optical path and the light-sensitive medium is arranged at the opposite end thereof, whereby the object is scanned by the optical system and the object image is formed at the light-sensitive medium.

6. The optical system defined in claim 1, wherein the light-sensitive medium is arranged at said one end of said optical path and the object is arranged at the opposite end thereof, whereby the object image is formed at and scanned across the light-sensitive medium.

7. The optical system defined in claim 6 wherein the light-sensitive medium is a photographic strip and said optical system further includes means for longitudinally advancing said strip past said one end of said optical path.

8. The optical system defined in claim 7, further comprising
   d. a movable opaque strip having a plurality of transparent characters disposed thereon and repeatedly positionable at said opposite end of said optical path; and
   e. flash lamp means for selectively illuminating individual ones of said characters.

9. The optical system defined in claim 1, wherein said reflecting surfce of said second mirror means is arranged substantially at said one end of said optical path.

* * * * *